United States Patent [19]

Squire

[11] 3,929,889
[45] Dec. 30, 1975

[54] SYNTHESIS OF AROMATIC AMINES BY REACTION OF AROMATIC COMPOUNDS WITH AMMONIA

[75] Inventor: Edward Noonan Squire, Glen Mills, Pa.

[73] Assignee: E. I. Du Pont de Nemours and Company, Wilmington, Del.

[22] Filed: Dec. 19, 1973

[21] Appl. No.: 429,023

Related U.S. Application Data

[63] Continuation-in-part of Ser. No. 115,774, Feb. 16, 1971, abandoned, and Ser. No. 99,636, Dec. 18, 1970, abandoned, which is a continuation-in-part of Ser. No. 22,716, March 25, 1970, abandoned.

[52] U.S. Cl........... 260/571; 260/288 R; 260/294.9; 260/296 R; 260/465 E; 260/558 R; 260/570 R; 260/574; 260/581
[51] Int. Cl.²......................................... C07C 85/18
[58] Field of Search............................ 260/581, 296

[56] References Cited
UNITED STATES PATENTS

| | | | |
|---|---|---|---|
| 2,040,396 | 5/1936 | Morrell et al. | 260/581 X |
| 2,948,755 | 8/1960 | Schmerling | 260/581 |
| 3,231,616 | 1/1966 | Jones | 260/581 |

FOREIGN PATENTS OR APPLICATIONS

| | | | |
|---|---|---|---|
| 553,988 | 3/1958 | Canada | 260/581 |

Primary Examiner—Lewis Gotts
Assistant Examiner—S. P. Williams

[57] ABSTRACT

An improved process for producing an aromatic amine is provided in which an aromatic compound is reacted with ammonia in the presence of a conditioned nickel/nickel oxide cataloreactant at a temperature of from about 150°C. to about 500°C. and at a pressure of from about 10 to about 1000 atmospheres.

13 Claims, No Drawings

SYNTHESIS OF AROMATIC AMINES BY REACTION OF AROMATIC COMPOUNDS WITH AMMONIA

RELATED APPLICATIONS

This application is a continuation-in-part of copending application Ser. No. 115,774 filed on Feb. 16, 1971, and of copending application Ser. No. 99,636 filed on Dec. 18, 1970 which is in turn a continuation-in-part of application Ser. No. 22,716 filed on Mar. 25, 1970, all now abandoned.

BACKGROUND OF THE INVENTION

As is well known, arylamines have been made in a variety of ways including reduction of the corresponding nitro compound, reaction of a chloro compound with ammonia either alone or with catalysts such as copper salts, reaction of phenols with ammonia and zinc chloride at an elevated temperature and by the well-known Hofmann amide rearrangement with a hypohalite or halogen and a base. For some time, more direct methods of producing arylamines have been sought.

More recently, Canadian Pat. No. 553,988 issued on Mar. 4, 1958 to Thomas describes a one-step process for the production of aromatic amines. One embodiment comprises contacting a mixture of benzene, ammonia and oxygen in the vapor phase with a platinum catalyst maintained at a temperature of about 1000°C. In another embodiment, a mixture of benzene and ammonia is contacted in the vapor phase with a reducible metal oxide such as nickel oxide at a temperature of about 100°C. to 1000°C. The benzene is directly converted to aniline as represented by the equation $$C_nH_6 + NH_3 + MO \longrightarrow C_6H_5NH_2 + H_2O + M,$$

wherein M represents the metal and MO represents the oxide thereof.

U.S. Pat. No. 2,948,755 issued on Aug. 9, 1960 to Louis Schmerling describes the preparation of aromatic amines by reacting an aromatic compound such as benzene with anhydrous ammonia in the presence of a compound of a group VI-B metal such as molybdenum, tungsten or chromium and a promoter consisting of an easily reducible metallic oxide such as an oxide of copper, iron, nickel, silver or gold at a temperature in the range from about 200° to 600°C. The easily reducible metallic oxide is stated to perform as a hydrogen acceptor to thus remove the by-product hydrogen produced, causing the reaction to proceed in the desired direction.

An earlier reference, J. B. Wibaut, Berichte, 50, 541-6 (1917), reported the synthesis of aniline by passing benzene and ammonia through an iron tube packed with reduced nickel, iron, and asbestos at a temperature in the range of 550° to 600°C.

While the methods of these references do provide direct processes for the production of the aromatic amine, they do so in low conversions and yields of the aromatic compound to aromatic amine.

SUMMARY OF THE INVENTION

It has now been found that improved conversions of aromatic compounds and higher yields of aromatic amine can be achieved when the aromatic compound in reacted with ammonia at a temperature of from about 150°C. to about 500°C. and at a pressure of from about 10 to about 1000 atmospheres in the presence of a conditioned nickel/nickel oxide containing cataloreactant.

By conditioned is meant that, prior to its use in the amination reaction, the nickel oxide component of the cataloreactant is partially reduced to elemental nickel in a reducing atmosphere such as hydrogen. The elemental nickel formed by this process is then partially oxidized back to nickel oxide in an oxidizing atmosphere such as oxygen, air or water.

DETAILED DESCRIPTION OF THE INVENTION

A. The Cataloreactant

The reaction beteween the aromatic compound and ammonia is an equilibrium reaction represented by the following equation using benzene as an example:

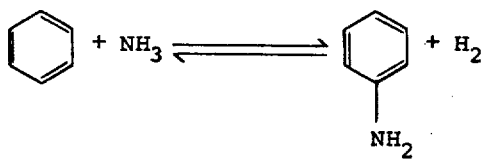

The mole ratio of ammonia/aromatic compound is preferably from 0.1 to 20, most preferably from 1.0 to 10, although any desired ratios may be employed.

The cataloreactants of the invention are nickel/nickel oxide compositions which function both as catalysts and as reactants in the amination of the aromatic compound. Specifically, the elemental nickel component catalyzes the reaction between the aromatic compound and ammonia while the nickel oxide component is the reactant. The nickel oxide is reduced to elemental nickel by the hydrogen formed during the reaction between the aromatic compound and ammonia. The preferred mole ratio of nickel to nickel oxide is 0.001 to 10, most preferably 0.01 to 1.

The cataloreactant of this invention is characterized by the fact that the size of the nickel crystallites varies from about 50 to 1000 A, preferably 80 to 250 A. If the crystallites are too large the activity of the catalyst is too low, and if the crystallites are too small unwanted side reactions take place because of overactivity.

The cataloreactant may be used alone or in a composition with a compound such as carbonate or an oxide of another metal, particularly an oxide which forms a cubic crystal structure such as zirconium. Whenever used herein, the term cataloreactant is intended to include cataloreactant compositions containing the oxides and carbonates suggested herein. Other oxides and carbonates of this type that can be used with the cataloreactant include those of strontium, barium, calcium, magnesium, zinc, iron, titanium, silicon, aluminum, thorium, uranium, cerium or one of the alkali metals. These may be used along with the nickel/nickel oxide composition or in conjunction with zirconium oxide. Combinations with certain clays such as kieselguhr can also be used. The compounds mentioned function in the nature of a support or as a promoter to enhance the cataloreactant properties of the nickel/nickel oxide system and prevent reduced nickel crystallite coalescence by physically separating the crystallites. The mole ratio of the total nickel in the form of nickel and nickel oxide in the cataloreactant to the other oxides and carbonates, particularly zirconium oxide expressed in terms of total nickel:zirconium or other oxide or carbonate metal ion is from 0.1 to 100, preferably 0.3 to 20.

Among the compounds mentioned, those of strontium, barium, calcium and the alkali metals are considered to be present in the cataloreactant predominantly as carbonates. In view of the hydrolytic conditions that obtain in the preparation of the cataloreactant, in some instances the carbonates may be hydrolyzed to the corresponding oxides or hydrous oxides. The compounds of the other metals mentioned, that is, compounds of zirconium, magnesium, zinc, iron, titanium, aluminum, silicon, cerium, thorium and uranium are considered to be present in the catalyst composition as the oxide or hydrous oxide.

The cataloreactants of this invention may be prepared by any suitable method. Generally, the system is precipitated from a solution of a nickel compound, preferably with a zirconium compound, such as the nitrate salt, by addition of a solution of a base such as ammonium carbonate, sodium hydroxide, lithium hydroxide, potassium hydroxide, ammonium hydroxide, sodium carbonate, sodium bicarbonate, potassium carbonate and the like and mixtures thereof. Additionally any nickel and zirconium salt or ester which can react with an oxygen source, such as oxygen, water or part of the salt anion to give oxides or hydrous oxides can be used.

After the precipitation of the components of the cataloreactant in the form of the oxide or hydrous oxide, the precipitate is filtered, washed, dried, reduced with hydrogen and exposed to a suitable amount of air or oxygen or optionally water until the desired oxidation product is achieved. The resulting solid product has surface area of at least 1.35 square meters per gram, preferably 1.35 to 300 square meters per gram, most preferably 20 to 200 square meters per gram.

In the conditioning operation, the cataloreactant is reduced by being exposed to hydrogen at a temperature between about 300°C. and 600°C., preferably 350°C. to 425°C. The hydrogen pressure can vary from 0.1 atmosphere to 10 atmospheres and preferably 0.1 to 2 atmospheres of pressure are employed. From about 10 percent to 90 percent of the nickel oxide and preferably 25 percent to 60 percent is reduced to metallic nickel in this step. The cataloreactant is then oxidized by treatment with a gas containing from about 0.1 percent to about 21 percent of oxygen, preferably 1 percent to 5 percent, at 30°C. to 800°C., preferably 100°C. to 500°C., and at 0.1 atmosphere to 600 atmospheres, preferably 1 to 300 atmospheres pressure, preferably for the length of time necessary to achieve a Ni/NiO mole ratio of 0.001 to 10, most preferably 0.01 to 1.

B. The Amination

The conditions under which the reaction between ammonia and the aromatic compound is carried out depend somewhat on the particular reactants. In general, temperatures of from about 150°C. to about 500°C., preferably 200° to 500°C., and pressures of from about 10 atmospheres to about 1000 atmospheres, preferably 30 to 750 atmospheres will be employed.

The amination process may be carried out either batchwise or in a continuous operation. In a batch-type operation, the cataloreactants of this invention are used in such quantities that the weight ratio of the cataloreactant, including, if desired, other oxides and/or carbonates as set forth hereinbefore, to the aromatic compound is from 0.01 to 10, preferably 0.2 to 3. Any suitable apparatus in which the reactants can be combined and mixed such as an agitated autoclave or a pressure vessel may be used as the reactor. Preferably, the reactor is heated to the reaction temperature before the amination reactants are introduced. Once the reactor contains the cataloreactant, ammonia and the aromatic compound to be aminated, it is sealed and the reaction is allowed to proceed to the degree of conversion desired. Thereafter, the apparatus and the contents are cooled to room temperature or lower, excess ammonia is vented and the aminated aromatic reaction product is separated from unreacted aromatic compounds, the cataloreactant and by-products by conventional means such as distillation, crystallization, and the like.

In a continuous operation, the process may be carried out in any suitable apparatus that will permit a contact time between the amination reactants and the cataloreactant of from 2 seconds to 20 minutes, preferably 30 seconds to 8 minutes. Some such suitable apparatus would include fixed bed reactors or packed vessels or coils, into which the cataloreactant, ammonia and the aromatic compound can be charged and the aromatic compound and ammonia can be passed through a cataloreactant bed. A moving bed operation may also be employed in which the reaction bed and the reactants either pass concurrently or countercurrently to each other. Still another type of continuous operation which may be employed is a fluidized bed or slurry type in which the cataloreactant is carried into the reactor as a slurry in one or more of the reactants.

In either the batch or continuous type of reactor the aromatic compound and the ammonia may be introduced separately or as a single mixed stream. The cataloreactant may either be regenerated intermittently or continuously with oxygen or an oxygen containing gas such as air.

In the preferred embodiment of this invention, the amination reaction is carried out at a temperature in the range of about 250°C. to about 500°C. and at a pressure ranging from about 30 atmospheres to about 700 atmospheres.

Any aromatic compound with which ammonia is miscible at the temperature and pressure of the reaction and which comes into intimate molecular contact with the cataloreactants of this invention may be directly aminated with ammonia as described herein. By intimate molecular contact is meant that, at the reaction temperature and pressure, the molecules of each reactant are in contact, on a molecular basis, with the cataloreactants of this invention. Some such suitable aromatic compounds include benzene, naphthalene, anthracene, phenanthrene, pyridine, quinoline, isoquinoline, mono- or di-substituted counterparts of any of them and the like, preferably benzene or pyridine.

Other aromatic compounds which may also be aminated in accordance with this invention include those having the formula $(X)_m(Y)_n$ wherein X is benzene or pyridine, $m$ is 1 or 2, $n$ is 0, 1 or 2, and Y is alkyl having one to six carbon atoms such as methyl, ethyl, propyl, butyl, amyl and hexyl, including cycloalkyl such as cyclohexyl and cyclopentyl; halogen such as fluoro and chloro; nitrile; hydroxy; $CONH_2$, alkoxy having one to six carbon atoms such as methoxy, ethoxy, propoxy, butoxy, and hexoxy including cycloalkoxy such as cyclohexoxy and cyclopentoxy; aryloxy such as phenoxy; amino including primary, secondary and tertiary amino wherein the secondary amino groups contain alkyl having one to five carbon atoms or aryl such as phenyl; aralkyl such as benzyl, including mono or dialkyl substituted aralkyls, wherein the alkyl groups contain one to five carbon atoms such as 2-methyl benzyl, 3-ethyl benzyl, 2,3-dimethyl benzyl and the like; with the proviso that when Y is aryloxy, a secondary or tertiary arylamine or an aralkyl, $n$ is 1. When $n$ is 2, the substituents Y may be the same or different. Any of the substituents Y may be considered on the naphthalene anthracene, phenanthrene, quinoline and isoquinoline nucleus as mentioned above.

Some more specific aromatic compounds which may be aminated directly with ammonia include biphenyl, bipyridine, 4,4'-dichlorobiphenyl, toluene, o, m and p-xylene, aniline, chlorobenzene, fluorobenzene, 1,4-dichlorobenzene, ethylbenzene, anisole, 3-chloropyridine, 4-propylpyridine, hexylbenzene, 4-ethoxypyridine, phenoxy benzene, 4-phenoxypyridine, 3-aminopyridine, dimethylamino benzene, 1,4-diamino benzene, 2,4-diaminopyridine, 4-cyanopyridine, benzamide, benzonitrile, phenetole, o, m, p-dimethyl benzene, 1-chloronaphthalene, 2,5-dichloronaphthalene, 1-fluoroanthracene, 2-methylphenanthrene, diphenyl methane, 4-phenyl-2-methyl pyridine, xylyl methyl benzene, 2(bisphenyl) propane, N,N-diethyl amino benzene, 4-(N-phenylamino)pyridine, N-pentylamino benzene, *m-phenylenediamine*, 3-amido pyridine, 1-methyl-3-ethyl benzene, o, m, p-chloroaniline o, m, p-chlorobenzonitrile 2-chloro-4-cyanopyridine, -methoxy benzamide; cyclohexyl benzene, 4-cyclopentylpyridine, 4-(N-methyl-N-phenyl) amino pyridine, 3-hydroxy pyridine, 1-hydroxy-3-chlorobenzene, 3-methoxy quinoline, 5-cyano isoquinoline, 4,4'-dicyanodiphenyl, 4-hydroxy-4'-fluorobiphenyl, 1,4-dichloroanthracene, 2,7-dihydroxy phenanthrene, 1-chloro-5-amido naphthalene, 5-phenoxy isoquinoline, 3-chloro-4-fluoroquinoline, 2-pentoxy-7-hydroxy phenanthrene, 1-(2,3-dimethyl phenyl) naphthalene, 1,4-dichloronaphthalene, methylisopropyl phenanthrene, 9,10-dichloroanthracene, dihydroanthracene, 2,3-dimethylanthracene, 9-ethylanthracene, aminoquinoline, aminophenylmethylquinoline, benzoquinoline, chloroquinoline, dimethylquinoline, quinolinol, methoxyquinoline, α-methylquinoline, cyanoquinoline, 2-, 3-, 4-methylisoquinoline, 2-, 3-, 4-pyridine, 3-benzylpyridine, 3,5-dimethyl pyridine, 3-ethyl-5-methyl pyridine, 4-hydroxy pyridine, 3-methyl-5-ethyl pyridine, 4-propyl pyridine, α-naphthylamine, 1-benzylnaphthalene, 1 or 2-chloronaphthalene, any of the naphthalene diamines, anthradiamines, dichloroanthracenes, dimethyl anthracenes, naphthalene diols, dichloronaphthalenes, and dimethylnaphthalenes, 1-ethoxynaphthalene, 1 or 2-fluoronaphthalene, isopropylmethyl naphthalene, 1 or 2 ethyl naphthalene, 1-methylisopropylnaphthalene, 1-phenylnaphthalene, naphthamide and the like as well as any other compounds which come within the definition and formula set out hereinbefore which will occur to those skilled in the art.

The preferred aromatic compounds for the amination reaction are diphenyl ether, its monoamino derivatives, benzene, aniline and pyridine with the production of mono and diamino diphenyl ethers, aniline, diamino benzene and 2-amino pyridine as the preferred objective.

Using phenylene diamine as an illustration, it will be seen in the examples that depending upon the particular cataloreactant and reaction conditions employed an aromatic diamine product comprising predominantly meta-phenylenediamine or predominantly ortho-phenylenediamine is obtained. In general, cataloreactants and reaction conditions leading to higher conversion of the aromatic monoamine to aromatic diamine favor the predominant production of meta-phenylenediamine; those leading to a lower conversion of aromatic monoamine to aromatic diamine favor the predominant production of ortho-phenylenediamine. The incorporation of carbonates or oxides of strontium, magnesium, cerium, and the alkaline earth metals and use of higher cataloreactant to aromatic monoamine ratios are also observed to favor meta-phenylenediamine production. A lower amination temperature appears to favor ortho-phenylenediamine production. When a mixture of an aromatic compound containing no amino groups and its monoamino derivative is to be aminated such as, for example, diphenyl ether, and a monoamino derivative thereof, it is preferred that the molar ratio of the monoamino derivative to the non-amino containing aromatic compound is from about 1:2 to 2:1.

The aromatic amines prepared by the process of this invention are useful in any application in which prior art aromatic amines have been employed such as, for example, in the preparation of isocyanates used to react with polyols in the production of urethanes.

The invention is further illustrated but is not intended to be limited by the following examples in which all parts and percentages are by weight unless otherwise specified.

EXAMPLE 1 — AMINATION OF BENZENE

Into an 8-liter stainless steel beaker there is charged 290.8 g (1.0 mole) of $Ni(NO_3)_2·6H_2O$, 124.2 g. (0.3 mole) of zirconyl nitrate, and 3000 ml. of distilled water. The mixture is stirred at room temperature to effect solution of the salts and to this solution there is rapidly added 163 g. (1.43 moles) of $(NH_4)_2CO_3·H_2O$ dissolved in 1500 ml. distilled water. After the addition the mixture is stirred for one hour, then filtered on a coarse, fritted glass filter. The precipitate is washed three times with 500 ml. of portions of distilled water and placed in a circulating air oven at 98°C. for 64 hours. After oven drying the precipitate containing hydrous oxides weighs 154.7 g.

The precipitate is broken up into largely ⅛ – ¼ inch particles by means of a mortar and pestle. This is then reduced in four portions; the reduction of one portion being described below. A 22 inch long quartz tube having a nominal 1 inch diameter is charged with 39.1 g. of the hydrous oxides and thereafter positioned vertically in a 12 inch split tube furnace with a thermocouple immersed in the center of the oxides. A gas mixture comprising 90 ml. helium and 10 ml. hydrogen per minute is introduced through the bottom of the tube. The temperature of the tube contains measured by the thermocouple is increased from room temperature to 380°C. over a 30 minute period. At 10 minute intervals the hydrogen concentration is increased from 10 to 25, to 50, to 75, and finally to 100 ml./min. The helium gas flow is correspondingly decreased so as to maintain the total gas flow into the tube substantially all the time at 100 ml./minute. The temperature setting is held at 380°C. for 1 hour with 100 ml. of hydrogen gas passing into the tube per minute during this time. At the end of this hour the hydrogen flow is stopped, the helium flow is set at 100 ml./min. and the tube contents are allowed to cool to 32°C.

A flow of 2 ml./minute of air is then introduced along with the 100 ml/minute flow of helium and after 6 minutes the air flow is increased to 10 ml/min. A slight exotherm occurs and the temperature rises to 46°C., after another 25 minutes the air is increased to 20 ml/min. and 19 minutes later to 40 ml/min; there again is a slight exotherm, the temperature rises from 30°C. to 35°C. and then subsides to 30°C. at which time the gas flow is terminated after 2 hours and 10 minutes exposure to air.

The charcoal-black granular to fine powder product weighing 26.5 g. and showing strong ferromagnetic properties is then transferred to a glass jar where it is combined with the other three similarly prepared portions.

Analysis: Total Nickel, 47.65 percent, reduced nickel as nickel metal, 4.77 percent.

Test Run — A

Into a 110 ml. mild steel shaker tube which has been purged with nitrogen, there is charged 10 g. of the cataloreactant described above and 23.4 g. of benzene after which the tube is closed and cooled in a Dry Ice bath. After cooling the contents, the tube is connected to a vacuum line and alternately evacuated and purged with nitrogen three times. The evacuated tube is then charged with 11.9 g. ammonia, closed, and placed on the shaker.

The tube is heated to 350°C. for 12 minutes while shaking at 84 — 12 inch strokes per minute under autogenous pressure, which is found to be in the range of 300–400 atmospheres in typical runs. After cooling, the tube is opened; it is found that 1.92 g. of aniline were produced.

Test Run — B

An identical shaker tube run is performed using the same quantities of reactants and cataloreactant plus 0.9 g. of distilled water; 2.30 g. aniline are produced.

Test Run — C

Test Run A is repeated except that the nickel oxide cataloreactant composition is not reduced prior to its use in the amination experiment. Only $4 \times 10^{-4}$ g. of aniline is obtained. The nickel oxide composition is observed to be only weakly ferro magnetic.

EXAMPLE 2

Using the same ingredients as in Example 1 but with somewhat different filtering and washing times and only 16 hours drying at 100°C. in a circulating air oven, 168.8 g. of hydrous oxides are obtained. These are reduced in four equal portions in a manner similar to that used in the first example except that nitrogen is employed in place of helium gas.

One of the portions is cooled to 80°C. in a 100 ml/minute stream of nitrogen following the hydrogen reduction and then 1 ml/minute of air is introduced into the nitrogen stream and an exotherm occurrs with the temperature rising to 170°C. in 7 minutes. In the next 41 minutes, the temperature decreases to approximately 80° (the furnace temperature) and at this time the air flow is increased to 10 ml/minute; the temperature of the bed rises in 5 minutes to 180°C. and then decreases. The nitrogen rate is changed to 50 ml/min. and the air flow is increased to 20 ml/min. and the tube cooled to room temperature. The 40 ml./min. nitrogen and 20 ml. per minute air flows are passed through the tube contents for an additional 63 hours and 23 minutes. The product is then transferred from the tube to a glass jar and allowed to stand until used in the following aniline synthesis.

Analysis: Total nickel, 46.26 percent; reduced nickel as nickel metal, 6.31 percent, Total Surface Area, 76.2 $m^2/g$.

A 110 ml. mild steel shaker tube is charged with 10 g. of the above product, 23.4 g. benzene and 11.9 g. ammonia in the same manner as in Example 1 and is subjected to the same conditions as described in Example 1. There are obtained 2.98 g. aniline.

EXAMPLE 3

One mole (290.8 g.) of $Ni(NO_3)_2 \cdot 6H_2O$ and 0.2 mole (82.4) of zirconyl nitrate are dissolved in 2000 ml. of distilled water. To this rapidly stirred solution there is rapidly added 104 g. (2.6 moles) of NaOH in 1000 ml. of distilled water and the resulting solution is stirred at ambient temperature for 1 hour and then filtered through a coarse fritted glass filter. After washing the precipitate three times with 400 ml. portions of distilled water, the hydrous oxides are placed in a circulating air oven for 16 hours at 100°C. The weight of the partially dried hydrated oxides is 146.2 g.

These are reduced by the procedure given in Example 2.

The resulting partially reduced oxides are then transferred to a glass jar and capped. Since air is present in the jar an exothermic reaction takes place which causes the jar to warm. The weight of the product is 102.9 g.

Analysis: Total nickel, 62.03 percent; reduced nickel calculated as metallic nickel, 5.89 percent. The total surface area is 51.3 $m^2/g$.

A 110 ml. shaker tube is charged with 100.7 g. of the above product, 23.4 g. benzene, and 11.2 g. ammonia in the same manner as given in Example 1. As in Example 1, the tube is shaken at 84—12 inch strokes/min. for 12 minutes at 350°C. and then cooled. An amount of 3.80 g. of aniline is produced.

EXAMPLE 4

One mole (290.8 g.) of $Ni(NO_3)_2 \cdot 6H_2O$, one mole (375.15 g.) of $Al(NO_3)_3 \cdot 9H_2O$ and 0.1 mole (40.4 g.) of $Fe(NO_3)_3 \cdot 9H_2O$ are dissolved in 2000 ml. of distilled water and the hydrous oxides are precipitated by rapidly adding 5.6 moles (224 g.) of NaOH in 1500 ml. distilled water. The mixture is stirred and filtered as in Example 2 and the precipitate is washed with three 500 ml. portions of distilled water. It is then dried 16 hours at 105°C. in a circulating air oven. The oven dried material weighs 214.4 g.

The reduction is carried out as described in Example 2 except that the reduction at 380°C. is for 1½ hours instead of for 1 hour. After cooling to room temperature under nitrogen the black to gray, fine to granular powder is transferred to a glass jar and capped. The bottle becomes warm as a result of the reaction between the powder and air; the product weighs 133.5 g.

Analysis: Total nickel, 73.02 percent; reduced nickel as nickel metal, 5.94 percent. Total surface area is 42.7 $m^2/g$.

A 110 ml. stainless steel shaker tube is charged with 63.8 g. of the above product, 23.4 g. benzene, 11.2 g. ammonia in the same manner as in Example 2 and the same heating-agitation cycle is used. There is produced 2.22 g. of aniline.

EXAMPLE 5

One-half mole (145.4 g.) of Ni(NO$_3$)$_2$·6H$_2$O, 187.6 g. (0.5 mole) of Al(NO$_3$)$_3$·9H$_2$O are dissolved in 1000 ml. of distilled water and to the stirred mixture there is slowly added 9.5 g. (0.05 mole) of TiCl$_4$. To this rapidly stirred mixture there is rapidly added 120 g. (3.0 mole) NaOH in 750 ml. distilled water and this is stirred 1 hour at room temperature prior to filtering. After filtering, the precipitate is washed three times with 400 ml. portions of distilled water and then placed in a circulating oven at approximately 100°C. for 16 hours; the weight is 111.3 g.

After breaking the agglomerate into particles of about ⅛ to ¼ inch the partially dried hydrous oxides are reduced in 2 portions in the hydrogen reduction equipment described in Example 1. The initial flow into the tube is 90 ml. N$_2$/10 ml. H$_2$ per minute and this is changed after a 30 minute interval to 75 N$_2$/25H$_2$, and then after another 30 minutes to 50 N$_2$/50 H$_2$. The temperature of the bed is kept ½ hour at 200°C., 250°C., 300°C., and finally at 380°C. for 1 hour.

After cooling to room temperature the tubes are emptied into a glass bottle and capped; the bottles become warm as a result of contact between the reduced material and the air. The product weighs 69.0 g.

Analysis: Total nickel, 62.97 percent; reduced nickel as nickel metal, 1.41 percent. Total Surface is 66.3 m$^2$/g.

The product described above, 66.6 g., is charged into a 120 ml. Hastelloy shaker tube along with 23.4 g. benzene, 11.2 g. ammonia in the same manner as given in Example 1, and in the same manner the tube is held at 350°C. for 12 minutes with agitation. There is produced 2.68 g. of aniline.

EXAMPLE 6

To 1 mole (290.8 g.) of Ni(NO$_3$)$_2$·6H$_2$O, 1 mole (375.15 g.) of Al(NO$_3$)$_3$·9H$_2$O, and 0.1 mole (41.4 g.) of zirconyl nitrate dissolved in 3000 ml. of distilled water there is rapidly added with rapid stirring a solution of 342.3 g. ammonium carbonate in 1500 ml. of distilled water. After stirring the mixture for 1 hour the precipitate is filtered and washed with three 500 ml. portions of distilled water. This is then dried 23 hours at 95–100°C. in a circulating air oven; the partially dried anhydrous oxides weigh 336.9 g.

The hydrogen reduction is carried out as in Example 2 except that the bed is held 1 hour at 280°C. prior to increasing the temperature to 380°C. After cooling to room temperature the material is transferred from the reduction tubes to a glass jar in the presence of air and the bottle warmed as a result of the reaction between the air and the material. The product weighs 134 g.

Analysis: Total nickel, 77.57 percent; reduced nickel as nickel metal, 1.12 percent. Total surface area is 219 m$^2$/g.

A 120 ml. Hastelloy Shaker tube is charged as described in Example 5 with 65.6 g. of the product described above, 23.4 g. benzene, and 11.2 g. ammonia. It is heated 12 minutes at 350°C. with the same agitation as in previous examples. Aniline, 3.71 g., is produced.

EXAMPLE 7

To a stirred solution containing 1 mole (290.8 g.) of Ni(NO$_3$)$_2$·6H$_2$O, 1 mole (400 g.) of Ludox 15% SiO$_2$, and 400 ml. of distilled water there is rapidly added 2.2 moles (88 g.) of sodium hydroxide dissolved in 400 ml. of distilled water. The temperature of the solution is raised to 80°C. and the stirring continued for 2 hours. The mixture is then filtered, washed with three 500 ml. portions of distilled water and the precipitate dried at 100°C. for 16 hours in a circulating air oven. The weight of the partially dried hydrous oxides is 186.8 g. This is reduced in 4 portions as given below.

A 46.7 g. portion of these oxides is reduced in a manner similar to that of Example 6 except that the temperature is held 2 hours at 280°C. and 2 hours at 380°C. After cooling to room temperatures the material is transferred from the reduction tube into a glass jar in the presence of air; the fine to granular powder reacts with the air warming the bottle. The product weighs 36.8 g.

Analysis: Total nickel, 37.68 percent; reduced nickel as nickel metal, 0.53 percent. Total surface area is 252 m$^2$/g.

A 120 ml. Hastelloy shaker tube is charged with 36.8 g. of the above product 23.4 g. benzene, 11.2 g. ammonia as previously described and the experimental run is made under the same conditions as in Example 6. Aniline, 1.23 g., is produced.

EXAMPLE 8 — AMINATION OF TOLUENE — CATALOREACTANT COMPOSITION

Ni/Zr(1/0.3)

A Ni/.3Zr cataloreactant is prepared following the procedure of Example 1 by dissolving 290.8g. Ni(NO$_3$)$_2$·6H$_2$O and 124.2 g. zirconyl nitrate in 3000 ml. of distilled water. The metal compounds are precipitated by the rapid addition of 163.1 g. ammonium carbonate in 1500 ml. distilled water. After filtering, washing, and oven drying the material is reduced with hydrogen as in Example 1 except that the temperature regulator is set at 150°C. for the first ½ hour of the reduction before being set at 380°C. Following the reduction the reduced material is cooled to room temperature in a 100 ml. nitrogen per minute/15 ml. air per minute gas stream.

A 110 ml. steel shaker tube is charged with 36.9 g. toluene, 48.2 g. of the above product, 17 g. ammonia and heated 12 minutes at 350° under autogenous pressure with agitation as described in Example 1. After cooling to room temperature the tube contents are found to contain 4.68 g. toluidines. The isomer distribution is meta—84.6 percent, para—8.5 percent, ortho—6.9 percent.

EXAMPLE 9 — AMINATION OF ANILINE — CATALOREACTANT COMPOSITION

Ni/Sr/Zr (1/.05/0.3)

Into an 8 l. stainless steel beaker there is placed 290.8 g. Ni(NO$_3$)$_2$·6H$_2$O, 10.6 g. Sr(NO$_3$)$_2$, 82.8 g. zirconyl nitrate and 3,000 ml. of distilled water. Solution of the salts is effected by rapidly stirring the mixture at room temperature. A separate solution is prepared by similarly dissolving 157.2 g. (NH$_4$)$_2$CO$_3$·H$_2$O in 1500 ml. of distilled water. The carbonate solution is quickly added to the nitrate solution while it is rapidly stirred. The resulting mixture is stirred for an additional hour at room temperature, then filtered on a coarse fritted glass filter and finally washed with three 500 ml. portions of distilled water. The semi-air dried green, paste-like material is dried for 17 hours in a circulating air oven at 120°C. The oven dried green solid weighs 158.6 g.

This green solid material is broken up by means of a mortar and pestle into largely ⅛ to ¼ inch granules and some fines. This is reduced in four portions as given in the following example of one portion.

A 22 inch long, 1 inch nominal diameter quartz tube is charged with 40.0 g. of the above material. The tube is positioned in a vertically mounted split-tube furnace. A platinum sheathed thermocouple is immersed from the top of the tube deep into the lower central portion of the bed; the thermocouple is connected to a temperature regulator unit which controls the furnace.

A gas inlet line is attached to the bottom of the tube and a gas mixture of 90 ml. $N_2$, 10 ml. $H_2$ per minute is passed into the tube.

The temperature regulator is set at 380°C. and turned on. In approximately 20 minutes the bed temperature reaches 480°C. demonstrating an exotherm which maintains the temperature above 400° for 22 minutes. During this time at 10 min. intervals the hydrogen concentration is increased from 90 $N_2$/10 $H_2$ to 75 $N_2$/25 $H_2$ to 50 $N_2$/50 $H_2$ to 25 $N_2$/75 $H_2$ to 100 ml. $H_2$/minute. The bed temperature is maintained at 380°–400°C. for an additional hour with 100 ml./min. hydrogen passing into the tube. The tube contents are cooled to room temperature under a 90 ml. $N_2$/10 ml. $H_2$ per minute gas stream and when at room temperature the fine to granular blackish powder is transferred to an 8 oz. jar in the presence of a limited amount of air. There is some warming of the bottle after the air comes in contact with the powder. The product weighs 20.7 g.

Analysis: Total nickel, 68.47 percent; Reduced nickel as nickel metal, 28.17 percent. The total surface area is 74.8 $m^2/g$.

Into a 110 ml. mild steel shaker tube which is flushed with nitrogen gas there is charged 20 g. of the above product, 18.6 g. aniline, 7.2 g. distilled water. The tube is closed and chilled to about −80°C. in a Dry Ice chest. After the contents cool, the tube is alternately evacuated by means of a vacuum line and flushed with nitrogen three times. The tube is then charged with 17 g. of ammonia, closed and heated 15 minutes at 350°C. with agitation at 84—12 inch strokes per minute under autogenous pressure, which is found to be in the range of 300–400 atmospheres in typical runs. Upon cooling to room temperature, the excess ammonia is slowly vented and the tube contents are found to contain 1.30 g. of phenylenediamines. The distribution of isomers by weight is found to be 74.5 percent meta-, 21.8 percent ortho-, and 3.7 percent para-phenylenediamine.

EXAMPLE 10 — AMINATION OF ANILINE — CATALOREACTANT COMPOSITION

Ni/Sr/Zr (1/0.1/0.3) — EFFECT OF WATER ADDITION

A solution made from 290.8 g. Ni($NO_3$)$_2$·$6H_2O$, 21.2 g. Sr($NO_3$)$_2$, 82.8 g. zirconyl nitrate and 3000 ml. distilled water is treated in the same manner as in Example 9 with a solution made by dissolving 163 g. ammonium carbonate in 1500 ml. of distilled water. Stirring, filtration, and washing of the precipitate are carried out in the same manner as in Example 9 and the precipitate is finally washed on the filter with a solution containing 10 g. sodium hydroxide in 500 ml. distilled water. The semi-air dried, green paste is dried 16 hours in a circulating air oven at 102°C. The oven dried solid material weighs 165.9 g.

One portion of this material, 43.2 g. is reduced in a manner similar to that described in Example 9 except that the peak temperature reaches 510°C. during the exotherm. After cooling the reduced material to room temperature under nitrogen, it is transferred to a glass jar in the presence of a small amount of air. The product weighs 25.4 g.

A 110 ml. mild steel shaker tube is charged with 18.6 g. aniline, 17 g. of ammonia and 20 g. of the above product in the same manner as described in Example 9. The tube is heated 7 minutes at 350°C. with agitation at 84—12 inch strokes/minute. On cooling to room temperature and slowly venting the excess ammonia the tube contents are found to contain 0.74 g. of phenylenediamines corresponding to 3.97 g. phenylenediamines/100 g. aniline charged.

The run is repeated exactly as described except that 3.6 g. of distilled water is added to the charge. There is obtained 1.38 g. of phenylenediamines.

EXAMPLE 11 — AMINATION OF ANILINE — CATALOREACTANT COMPOSITION — Ni/Sr/Zr (1/0.2/0.3)

A solution made by dissolving 290.8 g. Ni($NO_3$)$_2$·$6H_2O$, 42.3 g. Sr($NO_3$)$_2$, and 82.8 g. zirconyl nitrate in 3000 ml. of distilled water is treated with a solution containing 175.6 g. ammonium carbonate dissolved in 1500 ml. distilled water in the same manner as described in Example 9. Stirring, filtration, and washing of the precipitate are carried out as described in Example 9. The green paste-like material is dried in a circulating air oven at 80°C. for 16 hours at the end of which time the solid material weighs 164.2 g.

The solid is broken into largely ¼ ⅛ particles and reduced in four portions in the same manner as described in Example 9; the maximum temperature observed during the exotherm period is 460°C. After cooling to room temperature under nitrogen, the four batches are transferred to a glass jar containing a limited amount of air. The jar is placed in a Fisher mixer for 16 hours at room temperature. The catalyst weighs 97 g.

A 110 ml. mild steel shaker tube is charged with 40 g. of the above product, 18.6 g. aniline, 17 g. ammonia, 3.6 g. distilled water and heated with agitation for 7 minutes at 350°C. in the manner described in Example 9. After cooling and venting the excess ammonia, the tube contents are found to contain 2.27 g. phenylenediamines.

EXAMPLE 12 — AMINATION OF ANILINE — CATALOREACTANT COMPOSITION — Ni/Mg/Zr (1/0.2/0.3)

A solution is prepared by dissolving 290.8 g. Ni($NO_3$)$_2$·$6H_2O$, 51.3 g. Mg($NO_3$)$_2$·$6H_2O$, and 82.8 g. zirconyl nitrate in 3000 ml. distilled water and this is treated with a solution made by dissolving 176.2 g. ammonium carbonate in 1500 ml. distilled water in the manner described in Example 9. The stirring, filtration, washing operations are likewise carried out in the manner of Example 9. The green, paste-like material is dried 16 hours in a circulating air oven and at the end of this time the green solid weighs 180.6 g.

The green solid is reduced in four portions as described in Example 9 with the peak temperature observed to be 470°C. during the exotherm period. After cooling to room temperature under nitrogen, the four batches are transferred to an 8 ounce glass jar in the presence of a limited amount of air and this is tumbled on the Fisher mixer overnight. The resulting charcoal black granular to fine powder weighs 88.5 g.

A 110 ml. mild steel shaker tube is charged with 40 g. of the above powder, 18.6 g. of aniline, 3.6 g. of distilled water, 17 g. of ammonia and heated 30 minutes at 350°C. with agitation in the same manner as described in Example 9. Upon cooling to room temperature, the tube contents are found to contain 2.55 g. phenylenediamines.

EXAMPLE 13 — CATALOREACTANT COMPOSITION — Ni/U (0.25/0.05)

A solution is prepared from 72.7 g. $Ni(NO_3)_2 \cdot 6H_2O$, 25.1 g. $UO_2(NO_3)_2 \cdot 6H_2O$ and 750 ml. distilled water; this is treated with a solution made from 37.6 g. ammonium carbonate and 375 ml. distilled water in the same manner as described in Example 1. The mixture is stirred, filtered, and washed as in Example 1 except that 175 ml. portions of distilled water are used in the washing. After drying the paste-like material for 64 hours at 94°C. solid hydrous oxides, 27.3 g., are obtained.

Most of these hydrous oxides, 27.1 g., are reduced in one portion as described in Example 1. The peak temperature recorded during the reduction is 470°C. After cooling to room temperature under 100 ml. nitrogen/min., 2 ml./min. of air are introduced and this rate is stepwise increased to 5 ml., 10 ml., 20 ml., 40 ml. over a 2-hour period. The 100 ml./min. nitrogen 40 ml./min. air mixture is passed through the tube for 20 minutes and then stopped. The maximum temperature recorded during this aeration is 85°C. The product, a grey-black in color, as a granular to fine powder, weighs 17.4 g.

A 110 ml. mild steel shaker tube is charged with 10 g. of the above product, 18.6 g. aniline, 17 g. of ammonia and heated 7 minutes at 350°C. as described in Example 9. After cooling to room temperature and venting the excess ammonia, the tube contents are found to contain 0.916 phenylenediamines, comprising by weight 60 percent meta-, 35 percent ortho-, and 5 percent para-phenylenediamines.

On repeating the run, but with 2.7 g. of distilled water added to the charge, there is obtained 0.88 g. of phenylenediamines.

EXAMPLE 14 — CATALOREACTANT COMPOSITION — Ni/Ce (1/0.2)

A solution is prepared from 290.8 g. $Ni(NO_3)_2 \cdot 6H_2O$, 86.9 g. $Ce(NO_3)_3 \cdot 6H_2O$, 3000 ml. distilled water and this is treated with a solution made from 151 g. sodium carbonate and 1500 ml. distilled water as described in Example 9. The stirring, filtering, and washing are likewise performed according to the manner of Example 9. The resulting paste-like material is dried at 102°C. for 64 hours in a circulating air oven to give 185.6 g. of solid hydrous oxides.

This is reduced in four portions as given in Example 9 except the temperature setting is held for ½ hour at 150°C. prior to heating up to 400°C. The reduction is continued for 1 hour at 400°C. and then the tube contents are cooled to room temperature under 100 ml. per minute nitrogen. Air at 5 ml., 10 ml., 20 ml., 40 ml. per minute is then introduced into the nitrogen stream each for ½-hour period. The maximum temperature observed during the aeration is 66°C. The grayish-brown to bluish-black granular to fine powder product weighs 104.8 g.

A 110 ml. mild steel shaker tube is charged with 10 g. of the above product, 18.6 g. aniline, 2.7 g. distilled water, 17 g. ammonia and heated 7 minutes at 350°C. with agitation as described in Example 9. After cooling the tube to room temperature and venting the excess ammonia, the tube contents are found to contain 1.37 g. phenylenediamines, comprising by weight 69.9 percent meta-, 25.5 percent ortho-, and 4.6 percent para-phenylenediamines.

EXAMPLE 15 — CATALOREACTANT PREPARATION BY DECOMPOSITION OF NICKEL COMPOUND

Two quartz tubes as described in Example 9 are each charged with approximately 50 g. of nickel formate. Nitrogen at 50 ml. per minute is run through the tubes and the tube contents are slowly brought to 380°C. over a 5-hour period. They are held at 380°C. for 1 hour and then cooled to 52°C. and 80°C. at which temperatures 10 ml. air per minute are fed into the nitrogen stream for 25 minutes. There is no observable exotherm and the tube contents, a brown to gray-black powder weighing 28.9 g. are transferred to a glass jar, again without evidence of any exotherm.

A 110 ml. mild steel shaker tube is charged with 9 g. of the above powder, 18.6 g. aniline and 17 g. ammonia and the tube is heated 7 minutes at 350°C. with agitation as described in Example 1. After cooling to room temperature and venting the excess ammonia, the tube contents are found to contain 0.73 g. phenylenediamines, comprising by weight 44.8 percent meta-, 50.3 percent ortho-, and 4.9 percent para-phenylenediamines.

On repeating the run described above, but with 1.8 g. of distilled water added to the charge, there is obtained 0.85 g. of phenylenediamines, comprising by weight 69.9 percent meta-, 25.5 percent ortho-, and 4.6 percent para-phenylenediamines.

EXAMPLE 16 — CATALOREACTANT—Ni/Ca/Zr (1/0.1/0.2) — EFFECT OF TEMPERATURE DURING AMINATION (META DIRECTING)

A solution containing 290.8 g. $Ni(NO_3)_2 \cdot 6H_2O$, 23.6 g. $Ca(NO_3)_2 \cdot H_2O$ and 82.8 g. zirconyl nitrate in 3,000 ml. distilled water is mixed with a solution containing 116 g. sodium hydroxide in 1,500 ml. distilled water as described in Example 9. The resulting precipitate is filtered, washed and dried for 16 hours and 10 minutes in a circulating air oven at approximately 100°C. to give 170.4 g. of a green solid. This is broken up largely into ⅛ to ¼ inch granules and some fines and reduced with hydrogen in two portions according to the procedure of Example 1. The maximum temperature recorded during the reduction is 405°C. The reduced material (111.9 g.) is then cooled to room temperature under 100 ml. nitrogen per minute and transferred in air into a jar containing air, capped and stored until used in the following experiments.

Into a 110 ml. mild steel shaker tube there is charged 18.6 g. aniline, 10 g. of the above product and 17 g. ammonia; the tube is heated 12 minutes at 350°C. with agitation, cooled, and the excess ammonia vented as in Example 9.

The tube contents are found to contain 0.525 g. phenylenediamines comprised by weight of 50.8 percent meta-, 45 percent ortho-, and 4.2 percent para-phenylenediamines.

When the same experiment is repeated except that 3.6 g. distilled water are added to the charge and the reaction is carried out at 400°C. for 10 minutes, the tube contents contain 0.522 g. phenylenediamines, comprising 64.8 percent meta-, 29.5 percent ortho-, and 5.7% para-phenylenediamine.

EXAMPLE 17 — CATALOREACTANT-Ni/Zr (1/0.2) — Ba(OH$_2$) WASH—(ORTHO DIRECTING)

A solution of 290.8 g. (Ni(NO$_3$)$_2$·6H$_2$O in 3000 ml. distilled water is mixed with a solution of 107.2 g. NaOH in 1500 ml. distilled water, following essentially the procedure of Example 9. The resulting precipitate is filtered, washed three times with water followed by a wash with a solution of 15 g. barium hydroxide in 500 ml. distilled water. The paste-like green precipitate is dried 16 hours in a circulating air oven at 102°C. The resulting green solid (173.3g.) is broken up and reduced in two portions as described in Example 9 except that the temperature regulator is set immediately at 380°C. and the final part of the reduction is carried out for 1 hour at 380°C. with a flow of 100 ml. hydrogen per minute. The reduced composition is cooled to room temperature under 100 ml. nitrogen per minute. The two portions are transferred through air into a glass jar containing air and thoroughly mixed. There are obtained 59.2 g. of green to black powdery solid.

A 110 ml. mild steel shaker tube is charged with 10 g. of the above product, 18.6 g. aniline and 17 g. ammonia and heated for 7 minutes at 350°C. under autogenous pressure with agitation as described in Example 9. After cooling, venting the excess ammonia, and opening the tube, the tube contents are found to contain 0.351 g. phenylenediamines.

The phenylenediamine isomer distribution by weight is 66.2 percent ortho-, 1.6 percent para-, and 37.2 percent meta-phenylenediamines.

On repeating the above experiment using 3.6 g. distilled water in the charge, 0.444 g. phenylenediamine is obtained. The ortho isomer amounts to 58.5 percent.

In a third experiment using 5.4 g. distilled water in the charge, 0.52 g. phenylenediamine is obtained. The ortho isomer comprises 61.7 percent by weight of the mixture.

EXAMPLE 18 — CATALOREACTANT—Ni/NiO (ORTHO AND META DIRECTING)

A solution of 290.8 g. Ni(NO$_3$)$_2$·6H$_2$ in 3,000 ml. of distilled water is mixed under rapid stirring with a solution of 125.5 g. ammonium carbonate in 1500 ml. of distilled water. The resulting mixture is stirred for an additional hour at room temperature, then filtered, washed with 3-500 ml. portions of distilled water and dried for 64½ hours at 110°C. in a circulating air oven.

The dried green solid (110 g.) is broken up and reduced as in Example 9.

With the temperature regulator set at 380°C., and 42.8 g. of the green solid in the reduction tube, a gas mixture of 90 ml. N$_2$/10 ml. H$_2$ per minute is passed into the tube. In approximately 20 minutes the bed temperature reaches a temperature in the range of 432°-448°C., indicating an exotherm which maintains the temperature above 400°C. for about 20 minutes. Meanwhile, at 10 minute intervals the hydrogen concentration is increased step-wise from 90 N$_2$/10 H$_2$ to 75 N$_2$/25H$_2$ to 50 N$_2$/50 H$_2$ to 25 H$_2$/75 H$_2$ to 100 ml. H$_2$ per minute. The bed temperature is maintained at 380°C. to 388°C. for an additional hour with 100 ml. H$_2$ per minute passing into the tube. The material is cooled under nitrogen at 100 ml./minute to a temperature of 26°C. after which air at 2 ml./minute is introduced into the nitrogen stream passing into the tube for 38 minutes during which time the bed temperature increases to 36°C. The air is then increased to 5 ml./minute for 15 minutes, then to 10 ml./minute for 47 minutes, then to 20 ml./minute for 20 minutes and finally at 40 ml./minute for 30 minutes.

The black granular to fine powder product, 19.5g., is transferred through air into a bottle and stored overnight prior to use in the following experiment.

Into a 110 ml. mild steel shaker tube which had been flushed with nitrogen gas there is charged 10 g. of the above product 0.2 mole (18.6 g.) aniline and 17 g. of ammonia, heated to 350°C. for 7 minutes with agitation, cooled and the ammonia slowly vented. The tube contents are found to contain 0.63 g. of phenylenediamines, comprising 54.7 percent ortho-, 4.7 percent para-, and 40.6 percent meta-phenylenediamine.

On repeating the run with 1.8 g. distilled water added to the charge, there is obtained 0.70 g. of phenylenediamines, comprising 60.7 percent ortho-, 3.1 percent para-, and 36.2 percent meta-phenylenediamine.

EXAMPLE 19 — CATALOREACTANT Ni/Ti (1/0.3) — (ORTHO AND META DIRECTING

A slurry of 290.8 g. of Ni(NO$_3$)$_2$·6H$_2$O and 23.9 g. of titanium dioxide in 3000 ml. of distilled water is mixed under rapid stirring with 125.5 g. of ammonium carbonate in 1500 ml. of distilled water. The resulting precipitate is filtered, washed with water, dried and reduced with hydrogen as in Example 1.

A 110 ml. mild steel shaker tube is charged with 10 g. of the above product, 18.6 g. of aniline and 17 g. of ammonia and heated at 350°C. for 5 minutes under autogenous pressure. The phenylenediamines in the product, 0.193 g., comprise by weight 49.4 percent meta-, 4.4 percent para-, and 46.2 percent ortho-phenylenediamine.

EXAMPLE 20 — AMINATION OF DIPHENYL ETHER — (Ni/0.2 Mg./0.2 Zr Cataloreactant)

A Ni/0.2 Mg./0.2 Zr cataloreactant is prepared by dissolving 290.8g. of Ni(NO$_3$)$_2$·6H$_2$O, 51.3g. of Mg(NO$_3$)$_2$·6H$_2$O and 82.8g. of zirconyl nitrate in 3000 ml. of distilled water and precipitating the mixture by adding a solution of 176.2 g. (NH$_4$)$_2$CO$_3$·H$_2$O in 1500 ml. distilled water. After filtering and washing with distilled water the wet, green paste-like material is dried at 85°C. for 64 hours in a circulating air oven to give 139.6 g. of a green solid. This is broken up by means of a mortar and pestle largely into ⅛ - ¼ inch granules and some fine powder, of which 52.1 g. is charged into a 22 inch long 1 inch nominal diameter quartz tube. The tube is positioned in a vertically mounted split-tube furnace with a platinum sheathed thermo-couple immersed from the top of the tube deep into the lower central portion of the bed; the thermo-couple is connected to a temperature regulator unit which controls the furnace.

A gas inlet line is attached to the bottom of the tube and a gas mixture of 90 ml. N$_2$, 10 ml. H$_2$ per minute is passed into the tube.

The temperature regulator is set at 390°C. and turned on. The hydrogen concentration is increased step-wise at 10 minute intervals to 75 N$_2$/25 H$_2$, 50 N$_2$/50 H$_2$, 25 N$_2$/75 H$_2$ and finally to 100 ml. H$_2$/minute with no nitrogen. After 43 minutes from start-up time the bed temperature reaches 422°C. demonstrating a short exothermic reaction. After this, 100 ml. $H_2$/minute are passed through the bed for 1 hour at 390°C.

After cooling the reduced material to 36°C. under 100 ml. nitrogen per minute, 5 ml./min. of air are introduced into the nitrogen stream for 20 minutes, then 10 ml./min. for 40 minutes, then 20 ml./min. for 30 minutes and finally 40 ml./min. for 1½ hours. The maximum temperature recorded during this reaction is 52°C. There is obtained 30.8 g. of a charcoal-black granular to fine powder cataloreactant product.

A 110 ml. mild steel shaker tube which had been flushed with nitrogen is charged with 17 g. diphenyl ether and 20 g. of the above product. The tube is closed, chilled to dry ice temperature, evacuated and flushed with nitrogen three times and finally evacuated after which 17 g. of ammonia are condensed into the tube. The tube is again closed and heated for 7 minutes at 350°C. while being agitated at the rate of 84—12 inch strokes per minute in a pendulum shaker under autogenous pressure, which is found to be in the range of 300-400 atmospheres in typical runs. The tube is then cooled to room temperature, excess ammonia is vented and the product examined by gas chromatography. The contents of the tube are found to contain 2.28 g. of aminodiphenyl ethers. The isomer distribution is 3—73.1 percent, 2—14.6 percent, 4—12.3 percent.

EXAMPLE 21 — AMINATION OF DIPHENYL ETHER — (Ni/0.2 Ce/0.2 Zr Cataloreactant)

A Ni/0.2 Ce/0.2 Zr cataloreactant is prepared similarly to that of Example 1 by dissolving 290.8 g. Ni($NO_3$)$_2$·$6H_2O$, 86.9 g. Ce($NO_3$)$_3$·$6H_2O$ and 82.8 g. zirconyl nitrate in 3000 ml. distilled water and precipitating the mixture by adding a solution of 188 g. ($NH_4$)$_2CO_3$·$H_2O$ in 1500 ml. distilled water. After filtering and washing with distilled water, the wet, green, paste-like material is dried in a circulating air oven for 64 hours at 85°C. to give 189.3 g. of a solid product which is broken up largely into ⅛ to ¼ inch granules and some fines.

This is reduced with hydrogen in four portions according to the method of Example 20 except that the temperature regulator is first set at 150°C. for ½ hour before increasing the temperature to 390°C. for 1 hour. The maximum temperature recorded during these reductions is 428°C.

Each of the reduced portions is then cooled to 28°-36°C. under 100 ml./min. nitrogen and then air starting with 10 ml./min. and increasing to 40 ml./min is run through the reduced material over a 2 - 2½ hour period. The maximum temperature recorded during this reaction is 122°C.

The four portions of product, 120.7 g., are combined in one glass jar in the presence of air.

A 110 ml. steel shaker tube is charged with 17 g. diphenyl ether, 20 g. of the above product, 1.8 g. distilled water and 20.4 g. ammonia according to the procedure of Example 20. The tube is heated 7 minutes at 350°C. under autogenous pressure with agitation as described in Example 20. After cooling the tube contents are found to contain 3.11 g. aminodiphenyl ethers. The isomer distribution is 3—68.1 percent, 2—17.6 percent, 4—14.3 percent.

EXAMPLE 22 — AMINATION OF DIPHENYL ETHER (Ni/0.2 Sr/0.2 Zr Cataloreactant)

A Ni/0.2Sr/0.2Zr cataloreactant is prepared by dissolving 290.8 g. Ni($NO_3$)$_2$·$6H_2O$, 42.3 g Sr($NO_3$)$_2$, and 82.8 g. zirconyl nitrate in 3000 ml. distilled water and precipitating the mixture by the addition of 175.8 g. ammonium carbonate dissolved in 1500 ml distilled water as described in Example 20. After the precipitate is filtered and washed, the green, paste-like material is dried 17 hours in a circulating air oven to given 163.1 g. of a green solid.

This is reduced in 4 portions according to the procedure of Example 20 except that the temperature regulator is first set at 150°C. for ½ hour and the final reduction with hydrogen at 100 ml/min. is carried out with the temperature regulator set at 400°C. Immediately following the reduction, the furnace is turned off, opened, nitrogen at 100 ml/min. is introduced into the tube, and the hydrogen flow is stopped. After 5 minutes, 15 ml. air/min. are introduced into the nitrogen stream and the tube contents are cooled to room temperature in the 100 ml $N_2$—15 ml air per minute gas stream.

The resulting charcoal black granular to fine powder product is transferred through air and placed in a glass jar containing air.

A 110 ml steel shaker tube is charged with 17 g. diphenyl ether, 20 g. of the above product, 17 g. ammonia and heated 7 minutes at 350°C. under autogenous pressure with agitation as described in Example 20. After cooling the tube contents are found to contain 3.74 g. aminodiphenyl ethers. The isomer distribution is: 3 — 73.1 percent, 2 — 14.6 percent, 4 — 12.3 percent.

A very small amount of diaminodiphenyl ethers is also found in the product.

EXAMPLE 23 — CONCOMITANT AMINATION OF DIPHENYL ETHER AND AMINODIPHENYL ETHER (Ni/0.2 Sr/0.2 Zr Cataloreactant)

A Ni/0.2 Sr/0.2 Zr cataloreactant is prepared as described in Example 22 and used in the following experiment.

A 110 ml steel shaker tube is charged with 17 g. of a diphenyl ether solution containing 16.4 wt. percent aminodiphenyl ethers having an isomer distribution of 73.6 percent — 3, 13.1 percent — 2, and 13.3 percent — 4. To this there is added 20 g. of the above product, 17 g. of ammonia and 1.8 g. of distilled water after which the tube is heated for 7 minutes at 350°C. under autogenous pressure with agitation as described in Example 20.

After cooling, the tube contents are found to contain 0.56 g. diaminodiphenyl ethers.

The product is also found to contain 4.15 g. aminodiphenyl ethers having an isomer distribution of 71.9 percent — 3, 14.6 percent — 2, 13.5 percent — 4.

EXAMPLE 24 — AMINATION OF DIPHENYL ETHER (Ni/0.1 Ba/0.2 Zr Cataloreactant)

Following the amination procedure of Example 20 except that the cataloreactant contains a 0.1 molar amount of barium instead of the 0.2 molar amount of magnesium there is obtained 3.1 g. of aminodiphenyl ethers with an isomer distribution of 3 — 73.7 percent, 2 — 14.2 percent and 4 — 12.1 percent.

EXAMPLE 25 — AMINATION OF DIPHENYL ETHER (Ni/0.2 Fe/0.2 Zr Cataloreactant)

Following the amination procedure of Example 20 except that the cataloreactant contains a 0.2 molar amount of iron instead of the 0.2 molar amount of magnesium there is obtained 3.3 g. of aminodiphenyl ethers with an isomer distribution of 3 — 76.9 percent, 2 — 9.6 and 4 — 13.5 percent.

EXAMPLE 26 — AMINATION OF AMINODIPHENYL ETHER (Ni/0.2 Zr Cataloreactant)

Following the procedure of Example 20 a charge of 11.1 g of 4-aminodiphenyl ether hydrochloride, 17 g. of ammonia and 20 g. of Ni/0.2 Zr cataloreactant is reacted at 350°C. for 7 minutes to give approximately 1 g. diaminodiphenyl ethers.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. A process for aminating an aromatic compound selected from the group consisting of diphenyl ether, monamino derivatives thereof, benzene, aniline and toluene, said process comprising reacting ammonia with the aromatic compound at a temperature of from 150°C. to 500°C. and at a pressure of from 10 to 1000 atmospheres in the presence of a nickel/nickel oxide cataloreactant which has been partially reduced to elemental nickel and thereafter oxidized to form a cataloreactant having a mole ratio of nickel to nickel oxide of 0.001:1 to 10:1, said ammonia and aromatic compound being in intimate contact with said cataloreactant.

2. The process of claim 1 wherein the cataloreactant contains a member selected from the group consisting of oxides and carbonates of zirconium, strontium, barium, calcium, magnesium, zinc, iron, titanium, aluminum, silicon, cerium, thorium, uranium and the alkali metals.

3. The process of claim 2 wherein the cataloreactant contains zirconium oxide.

4. The process of claim 3 wherein the mole ratio of total nickel to zirconium oxide expressed as total nickel to zirconium is 0.1:1 to 100:1.

5. The process of claim 1 wherein the temperature is 200°C. to 500°C.

6. The process of claim 1 wherein the pressure is 30 to 700 atmospheres.

7. The process of claim 1 wherein the aromatic compound is benzene.

8. The process of claim 1 wherein the aromatic compound is toluene.

9. The process of claim 1 wherein the aromatic compound is diphenyl ether.

10. The process of claim 1 wherein the aromatic compound is aniline.

11. The process of claim 1 wherein the aromatic compound is monoamino derivative of diphenyl ether.

12. The process of claim 1 wherein the aromatic compound is a mixture of an aromatic compound containing no amino groups and its monoamino derivative.

13. The process of claim 12 wherein the molar ratio of the monoamino derivative to the non-amino containing aromatic compound is from about 1:2 to 2:1.

* * * * *